(12) United States Patent
Bays et al.

(10) Patent No.: US 11,971,096 B2
(45) Date of Patent: Apr. 30, 2024

(54) MECHANICAL RETURN-TO-PARK FEATURE FOR SHIFT-BY-WIRE TRANSMISSION

(71) Applicant: GHSP, Inc., Holland, MI (US)

(72) Inventors: Jeffrey Lee Bays, Grand Haven, MI (US); Phillip Torrey Merrill, II, Ravenna, MI (US)

(73) Assignee: GHSP, Inc., Holland, MI (US)

( * ) Notice: Subject to any disclaimer, the term of this patent is extended or adjusted under 35 U.S.C. 154(b) by 57 days.

(21) Appl. No.: 17/783,283

(22) PCT Filed: Dec. 3, 2020

(86) PCT No.: PCT/IB2020/061437
§ 371 (c)(1),
(2) Date: Jun. 8, 2022

(87) PCT Pub. No.: WO2021/116845
PCT Pub. Date: Jun. 17, 2021

(65) Prior Publication Data
US 2023/0012064 A1     Jan. 12, 2023

Related U.S. Application Data

(60) Provisional application No. 62/945,414, filed on Dec. 9, 2019.

(51) Int. Cl.
*G05G 1/04* (2006.01)
*F16H 59/02* (2006.01)
(Continued)

(52) U.S. Cl.
CPC ............... *F16H 59/02* (2013.01); *G05G 1/04* (2013.01); *G05G 5/05* (2013.01); *B60K 20/02* (2013.01)

(58) Field of Classification Search
CPC .. F16H 59/02; F16H 59/10; F16H 2059/0286; F16H 2059/0295;
(Continued)

(56) References Cited

U.S. PATENT DOCUMENTS 8,897,974 B2    11/2014    Wu et al.
10,288,165 B2 *   5/2019    Makimura .......... F16H 59/0278
(Continued)

FOREIGN PATENT DOCUMENTS

DE        102005060933        6/2007
DE        102018222760 A1 *   7/2019       F16H 49/005
(Continued)

*Primary Examiner* — Bobby Rushing, Jr.
(74) *Attorney, Agent, or Firm* — Price Heneveld LLP

(57) ABSTRACT

A selector mechanism includes a selector interface having a detent member. An artificial feel positioner defines a plurality of artificial feel positions that correspond to selectable positions of the selector interface. The plurality of artificial feel positions are connected via a screw channel that helically extends along the artificial feel positioner. A motor rotationally operates the artificial feel positioner to automatically operate the detent member through the screw channel to move the detent member and the selector interface to a desired position of the detent member and the selector interface.

20 Claims, 14 Drawing Sheets

(51) Int. Cl.
*G05G 5/05* (2006.01)
*B60K 20/02* (2006.01)

(58) Field of Classification Search
CPC ........ F16H 2061/243; F16H 2061/247; G05G 1/04; G05G 5/05
See application file for complete search history.

(56) References Cited

U.S. PATENT DOCUMENTS

| | | | |
|---|---|---|---|
| 10,704,670 B2* | 7/2020 | Kim | F16H 59/0204 |
| 2010/0307276 A1* | 12/2010 | Giefer | F16H 59/10 |
| | | | 74/473.1 |
| 2013/0047766 A1* | 2/2013 | Carrier | F16H 1/16 |
| | | | 74/425 |
| 2013/0139632 A1* | 6/2013 | Rake | F16H 59/08 |
| | | | 74/473.3 |
| 2018/0348808 A1* | 12/2018 | Mizukami | G05G 5/03 |

FOREIGN PATENT DOCUMENTS

| | | | | |
|---|---|---|---|---|
| JP | H0599326 | | 4/1993 | |
| KR | 1020120037244 | | 4/2012 | |
| KR | 20190030288 A | * | 3/2019 | ............. F16H 59/02 |
| KR | 20190081625 A | * | 7/2019 | ............. F16H 59/02 |
| SU | 1779623 | | 7/1992 | |
| WO | WO-2005039914 A2 | * | 5/2005 | ......... F16H 59/0204 |

\* cited by examiner

US 11,971,096 B2

1

MECHANICAL RETURN-TO-PARK FEATURE FOR SHIFT-BY-WIRE TRANSMISSION

FIELD OF THE INVENTION

The present invention generally relates to vehicle shifters, and more specifically to a mechanical return-to-park mechanism having a rotationally operable artificial feel positioner.

BACKGROUND OF THE INVENTION

In conventional vehicles, a shift by wire mechanism digitally operates a transmission for a vehicle between the plurality of transmission gears. As part of this mechanism, a mechanical shifter is incorporated to allow the user to operate the shift by wire mechanism. In certain instances, such as a return-to-park function, the shift by wire mechanism operates automatically to place the transmission in to the park position. A visual cue that this operation has taken place is typically reflected in an electrical display.

SUMMARY OF THE INVENTION

According to one aspect of the present invention, a selector mechanism includes a selector interface having a detent member. An artificial feel positioner defines a plurality of artificial feel positions that correspond to selectable positions of the selector interface. The plurality of artificial feel positions are connected via a screw channel that helically extends along the artificial feel positioner. A motor rotationally operates the artificial feel positioner to automatically operate the detent member through the screw channel to move the detent member and the selector interface to a desired position of the detent member and the selector interface.

According to another aspect of the present invention, a selector mechanism for a vehicle includes a selector interface having a positioning member. An artificial feel positioner includes a continuous screw channel that defines a plurality of selectable positions of the selector interface. The continuous screw channel in a stationary state defines a detent relationship between the positioning member and the continuous screw channel. A corresponding rotational position is defined, with respect to a rotational axis of the selector interface, of each selectable position of the plurality of selectable positions. An actuator operates to define a translating state that rotates the artificial feel positioner about a positioner rotational axis. Operation of the actuator guides the positioning member through the continuous screw channel and about the rotational axis of the selector interface.

According to another aspect of the present invention, a selector mechanism includes a selector interface having a detent member. An artificial feel positioner includes a continuous screw ridge. The continuous screw ridge in a stationary state defines a plurality of artificial feel positions. The artificial feel positions correspond to selectable positions of the selector interface. The plurality of artificial feel positions are connected via the continuous screw ridge that helically extends along the artificial feel positioner to define a screw channel. A positioner actuator rotationally operates the artificial feel positioner to define a translating state. Operation of a motor translates the detent member along the continuous screw ridge and through the screw channel to translate the detent member and the selector interface about

2 a rotational axis of the selector interface to a desired rotational position relative to the rotational axis.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
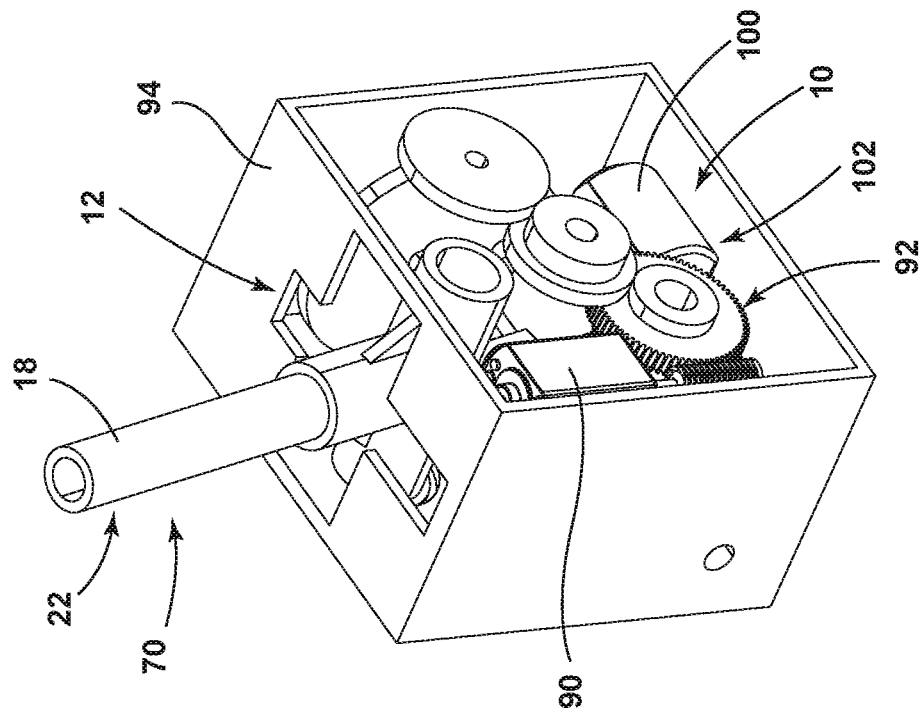
FIG. 2 is another top perspective view of the selector mechanism of FIG. 1 with a portion of the outer housing removed.
Figure 1:
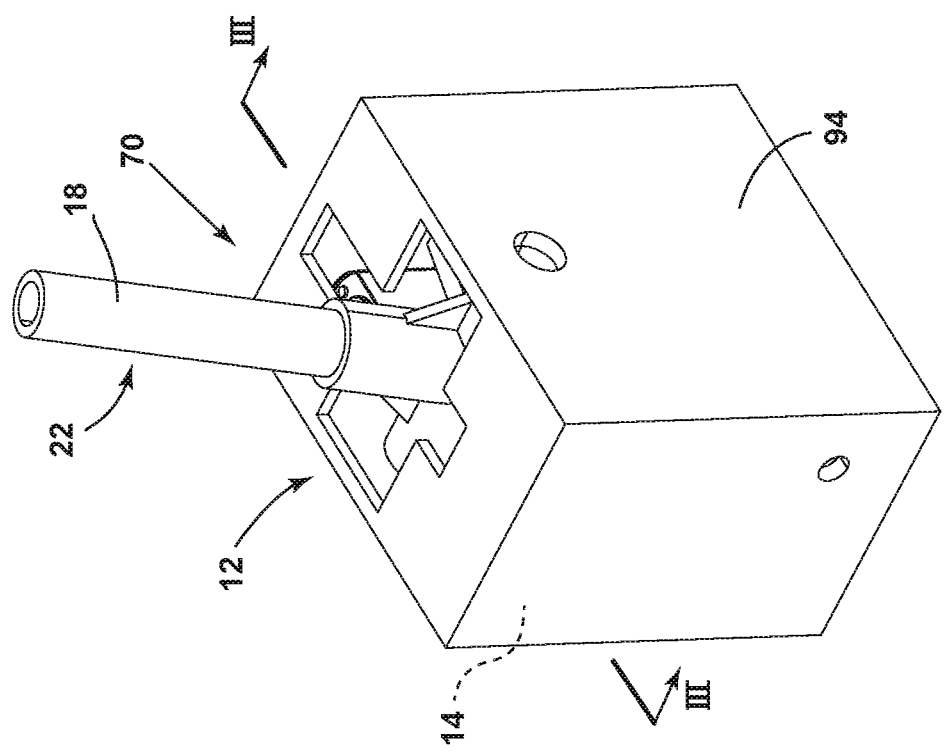
FIG. 1 is a top perspective view of an aspect of a selector mechanism.
Figure 3:
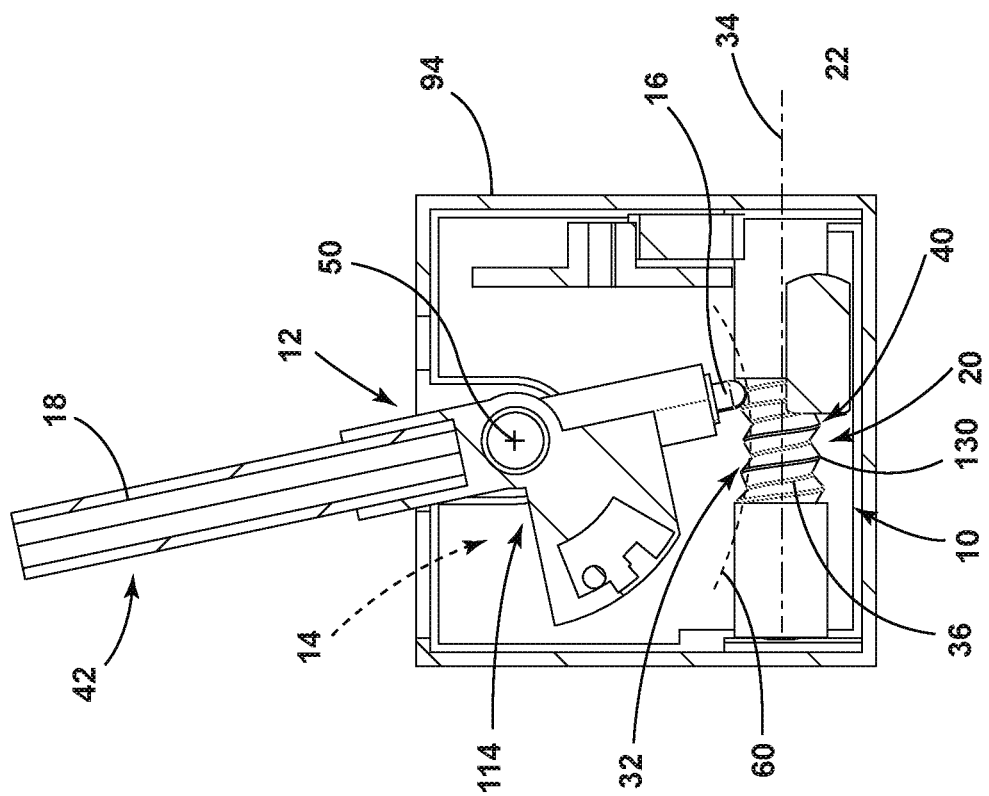
FIG. 3 is a cross-sectional view of the selector mechanism of FIG. 1 taken along line III-III.
Figure 4:
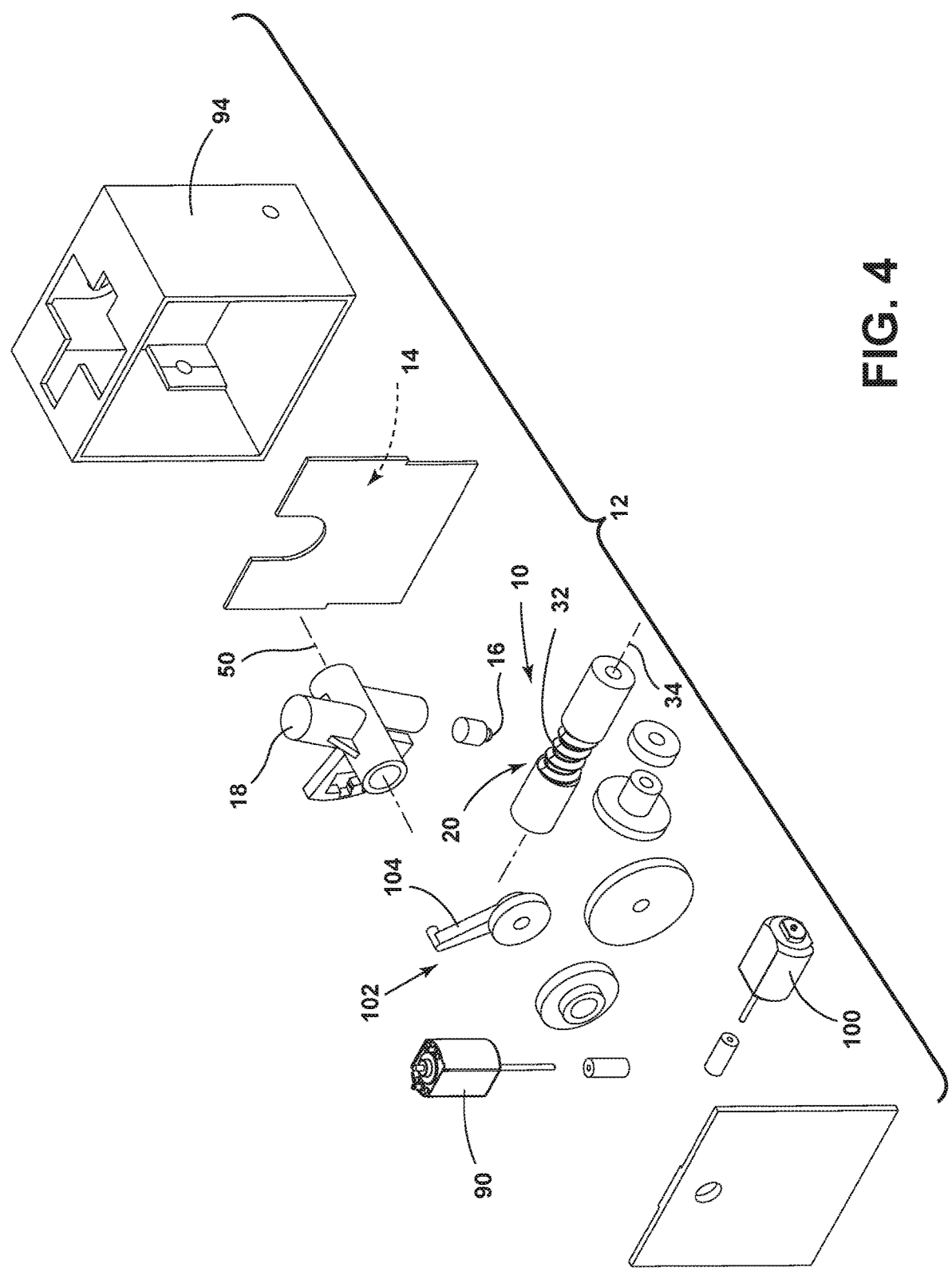
FIG. 4 is an exploded perspective view of the selector mechanism of FIG. 1.
Figure 5:
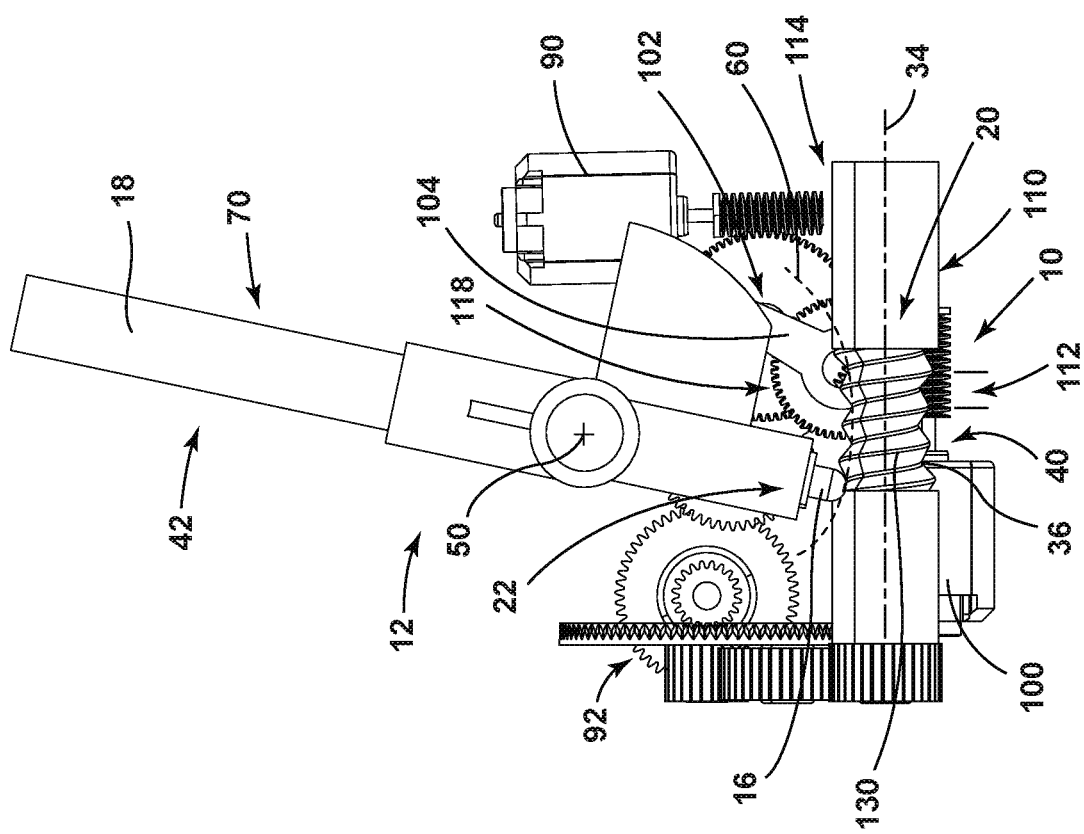
FIG. 5 is a side elevational view of an aspect of a selector mechanism and showing the selector in a drive position.
Figure 6:
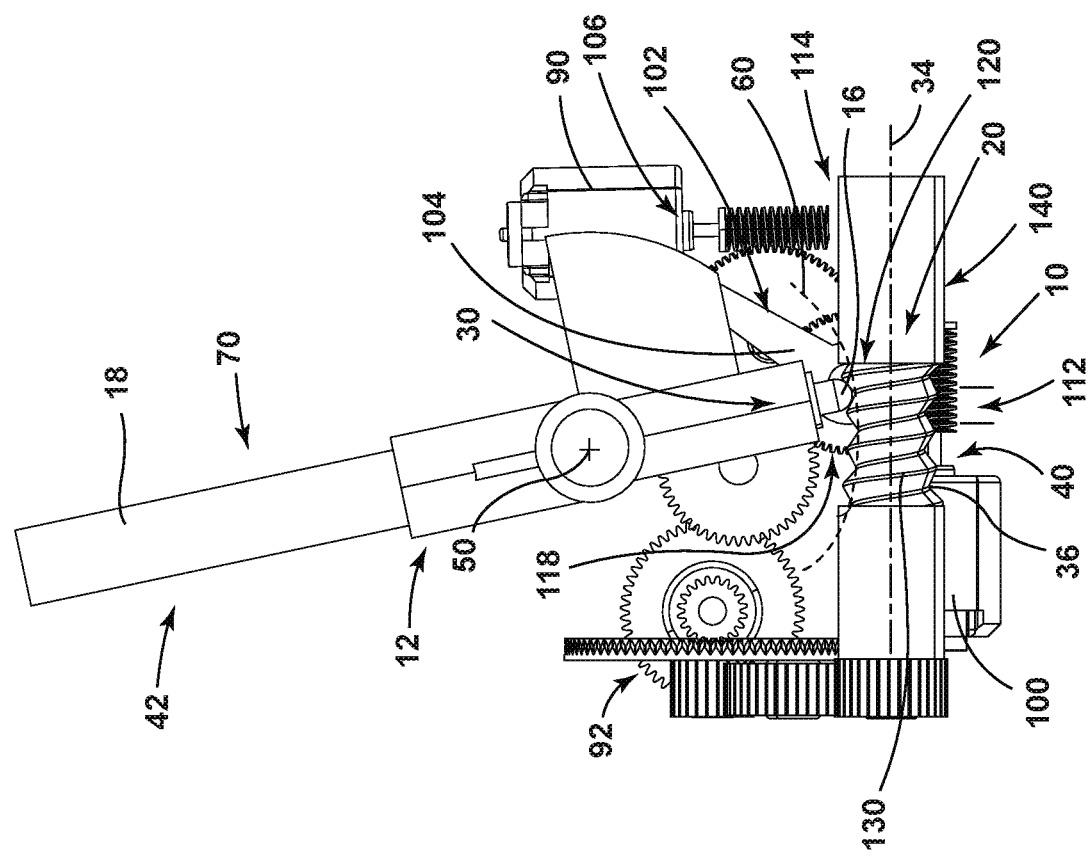
FIG. 6 is another side elevational view of the selector mechanism of FIG. 5, showing the selector interface in a park position.
Figure 8:
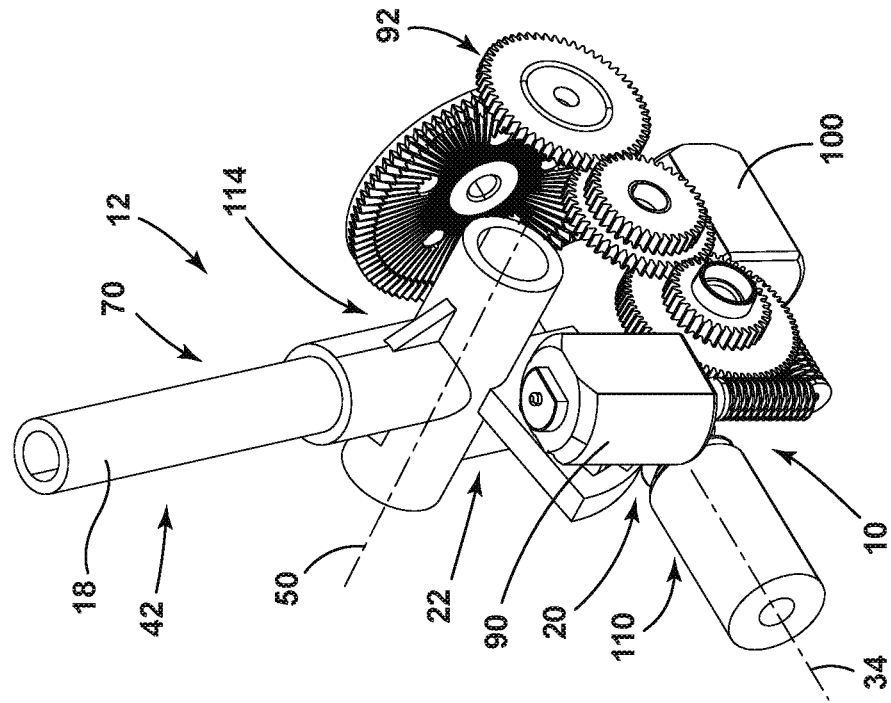
FIG. 8 is another top perspective view of the selector mechanism of FIG. 5.
Figure 7:
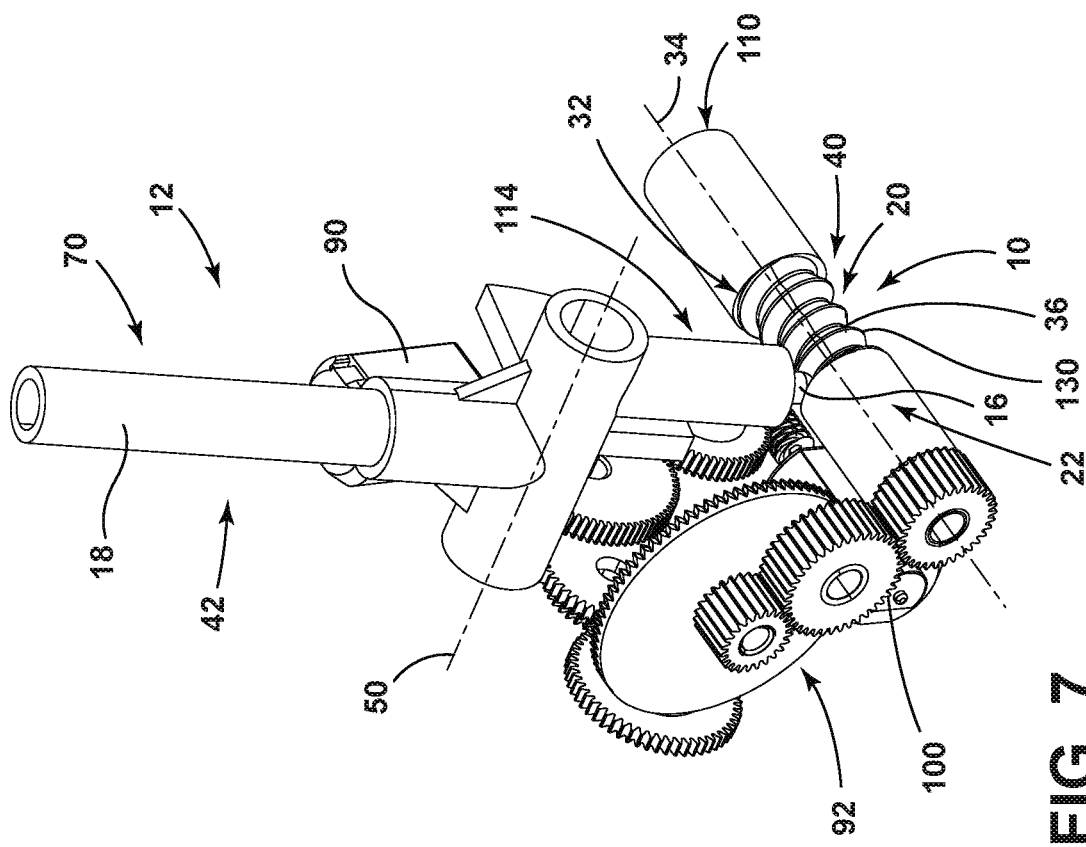
FIG. 7 is a top perspective view of the selector mechanism of FIG. 5.
Figure 9:
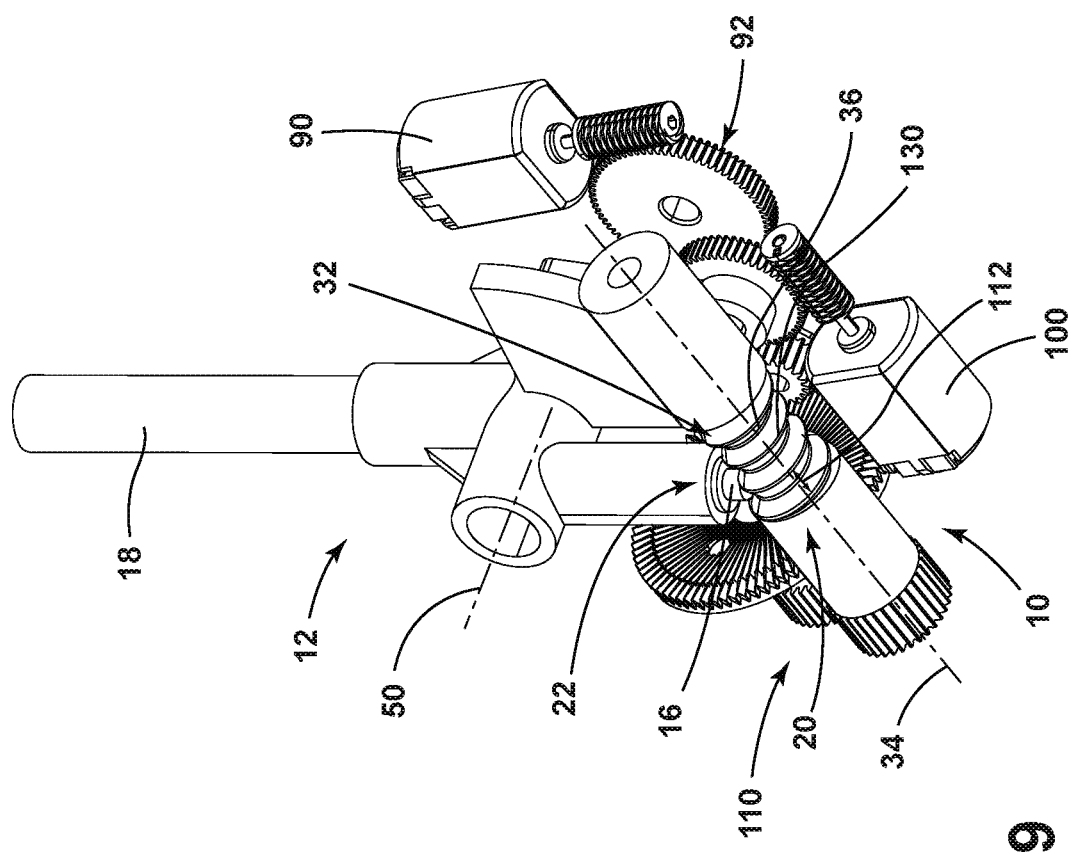
FIG. 9 is a bottom perspective view of the selector mechanism of FIG. 5.
Figure 10:
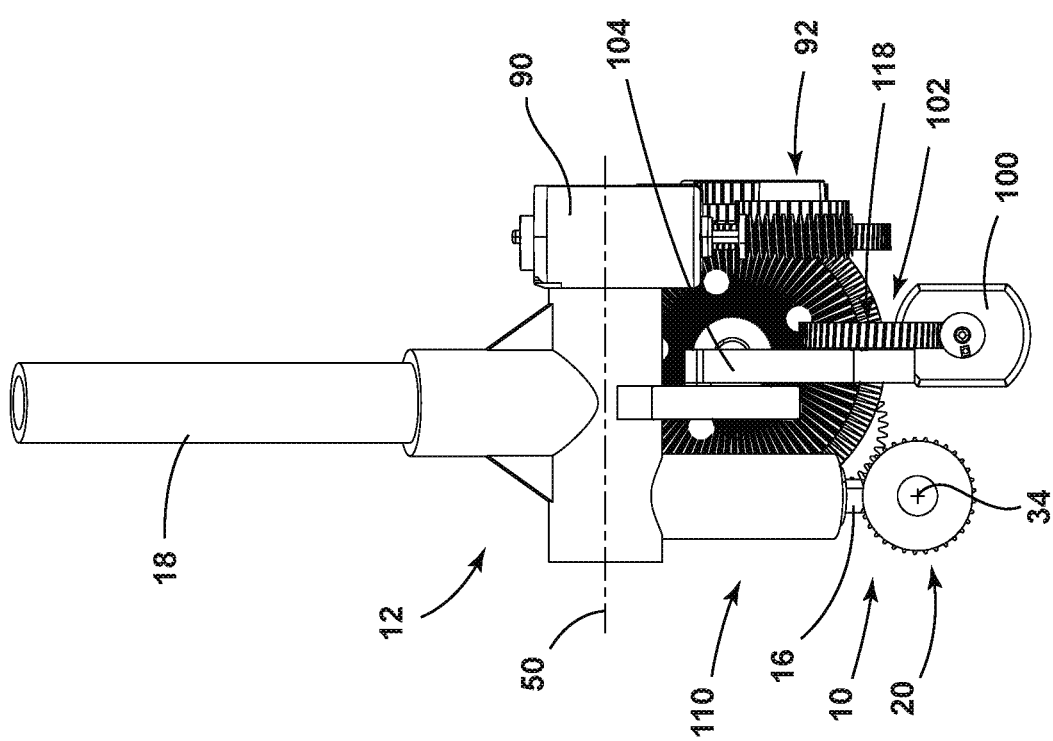
FIG. 10 is a side elevational view of the selector mechanism of FIG. 5.
Figure 12:
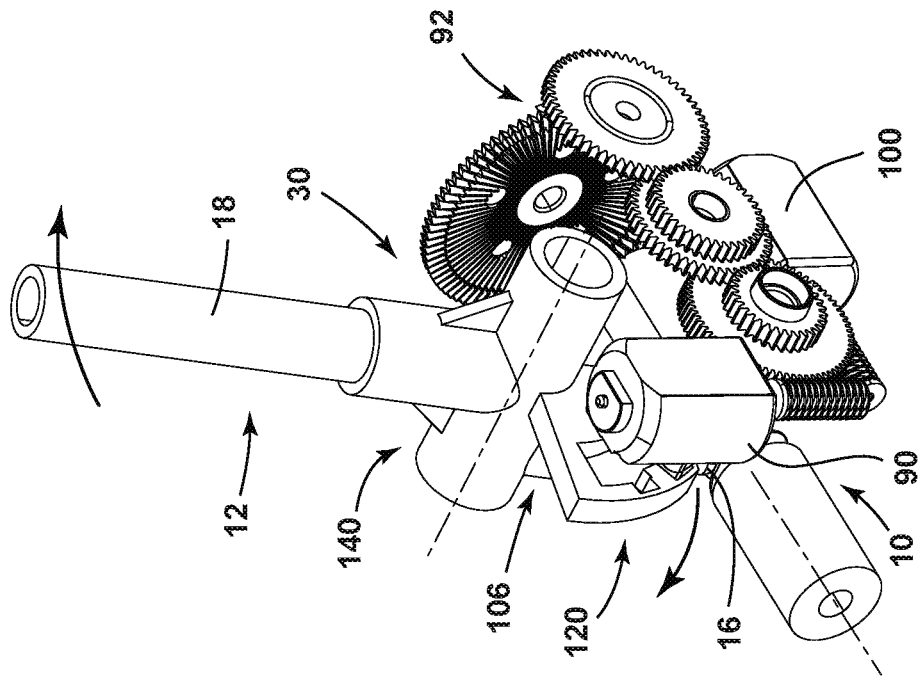
FIG. 12 is another top perspective view of the selector mechanism of FIG. 6.
Figure 11:
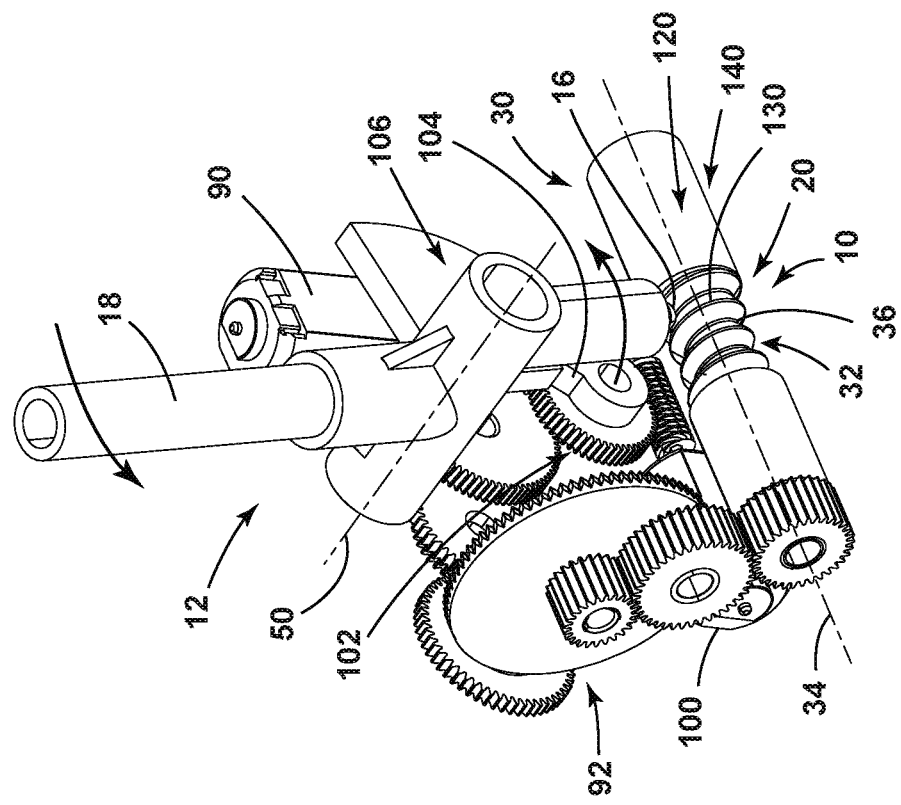
FIG. 11 is a top perspective view of the selector mechanism of FIG. 6.
Figure 14:
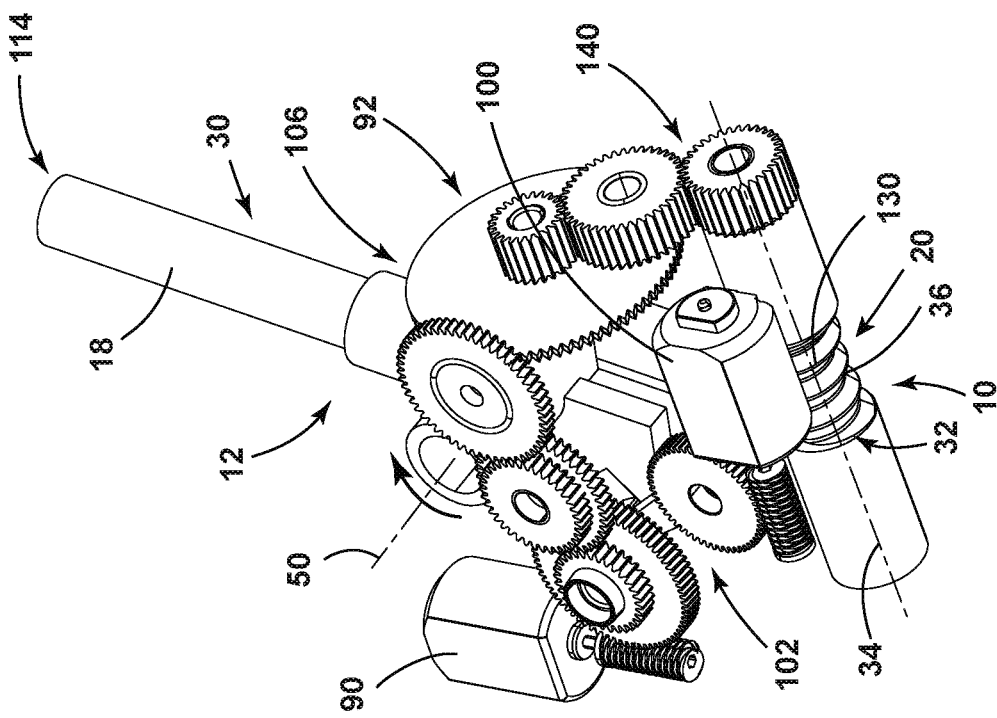
FIG. 14 is another bottom perspective view of the selector mechanism of FIG. 6.
Figure 13:
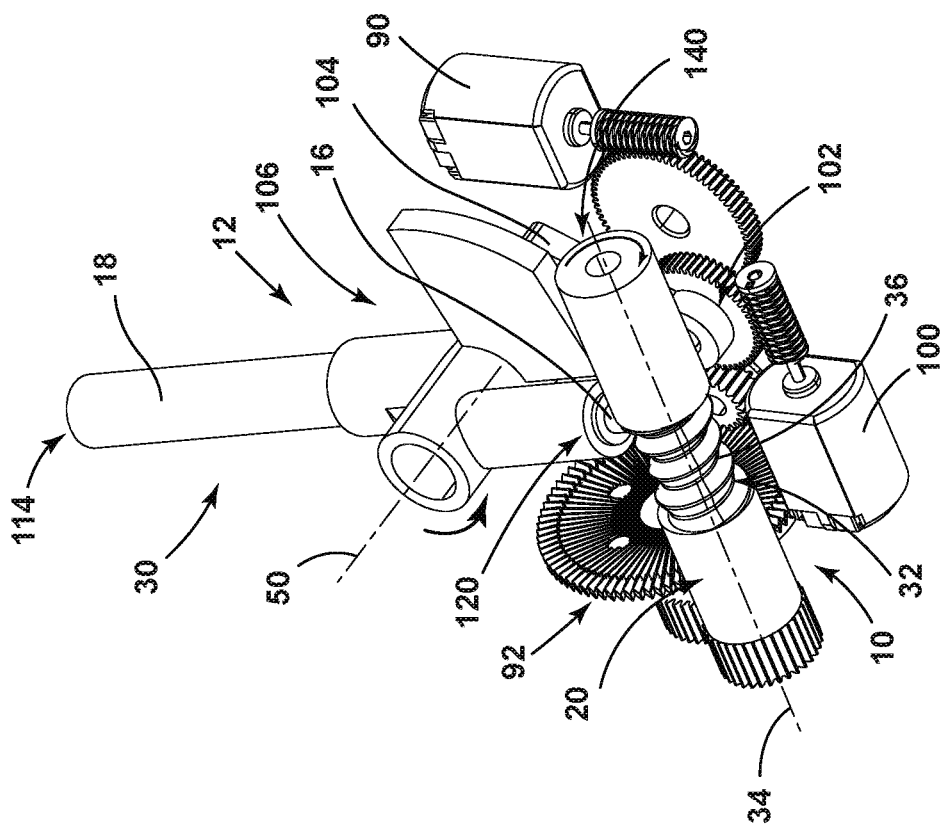
FIG. 13 is a bottom perspective view of the selector mechanism of FIG. 6.
Figure 15:
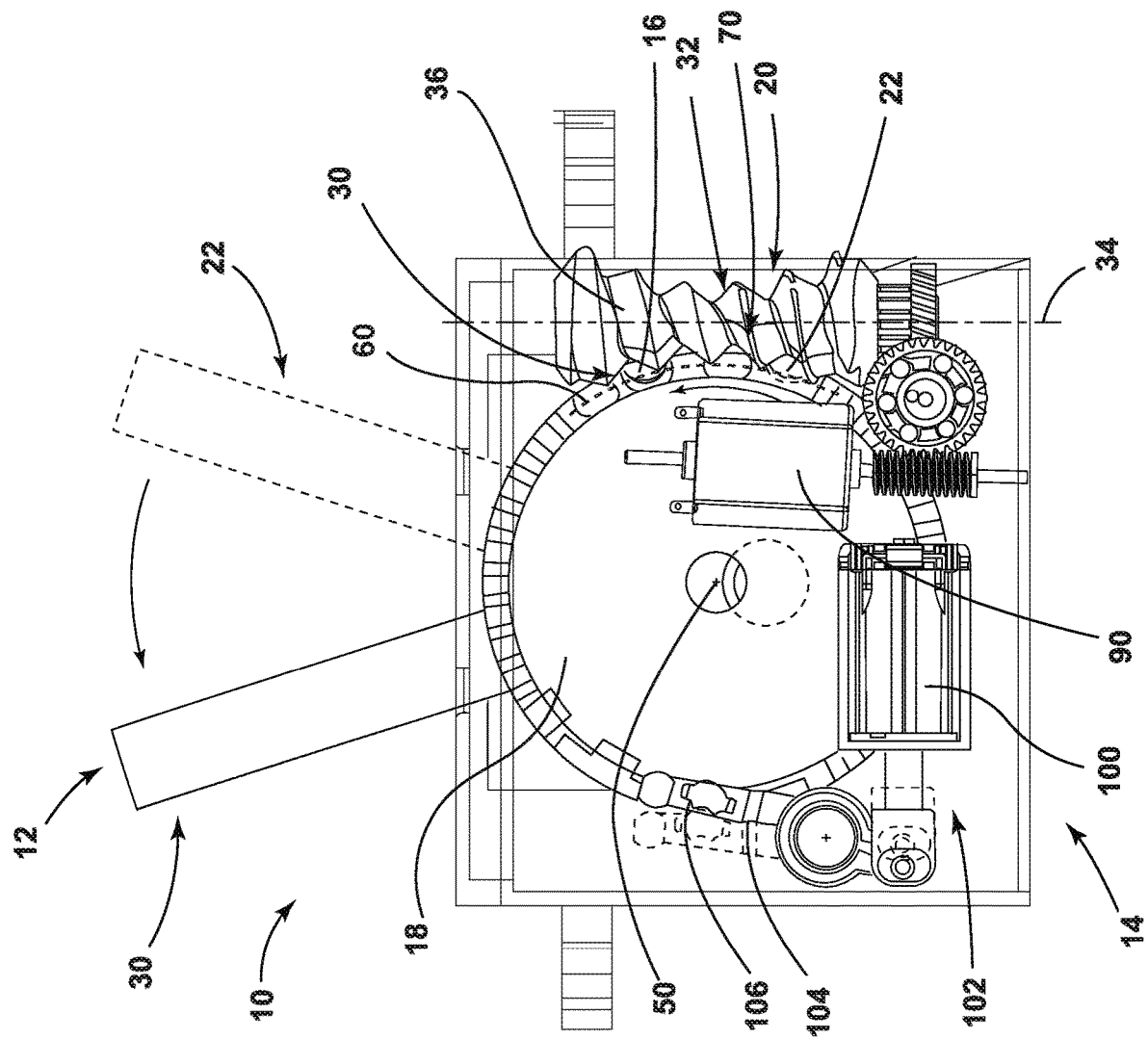
FIG. 15 is a side elevational view of an aspect of the selector mechanism.
Figure 16:
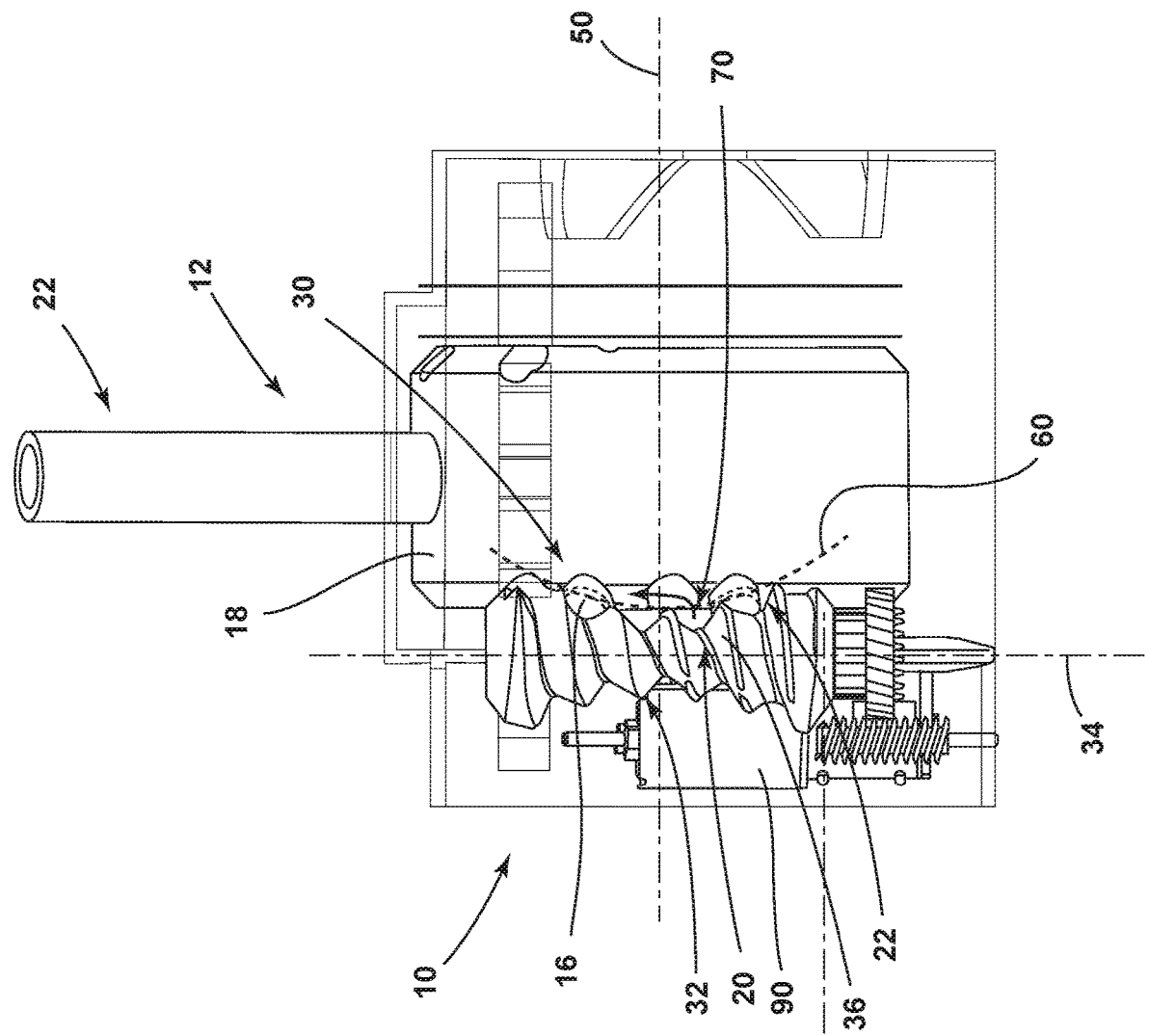
FIG. 16 is another side elevational view of the selector mechanism of FIG. 15.
Figure 17:
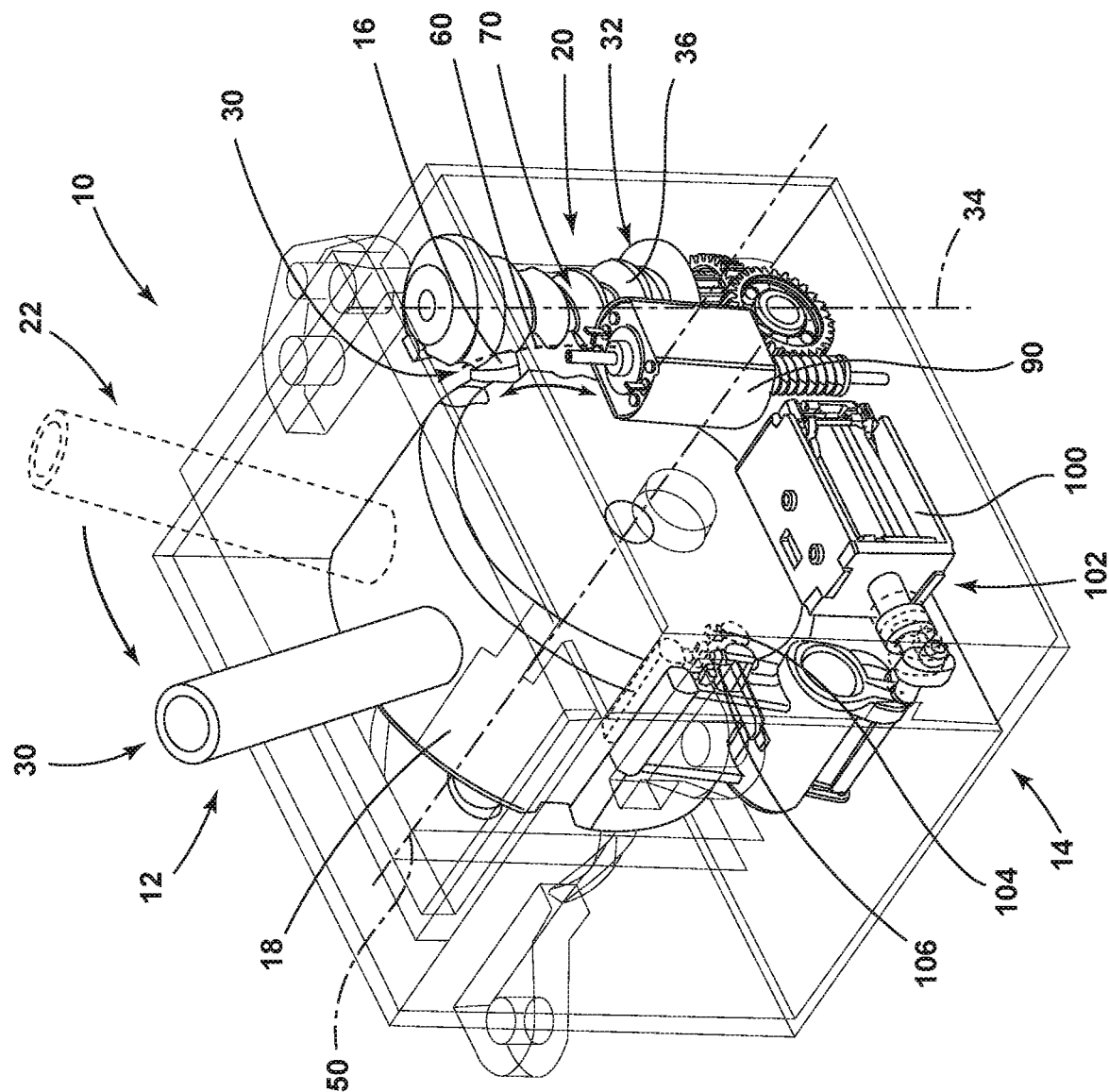
FIG. 17 is a top perspective view of the selector mechanism of FIG. 15 and showing operation of the selector mechanism between the park and drive positions.
Figure 18:
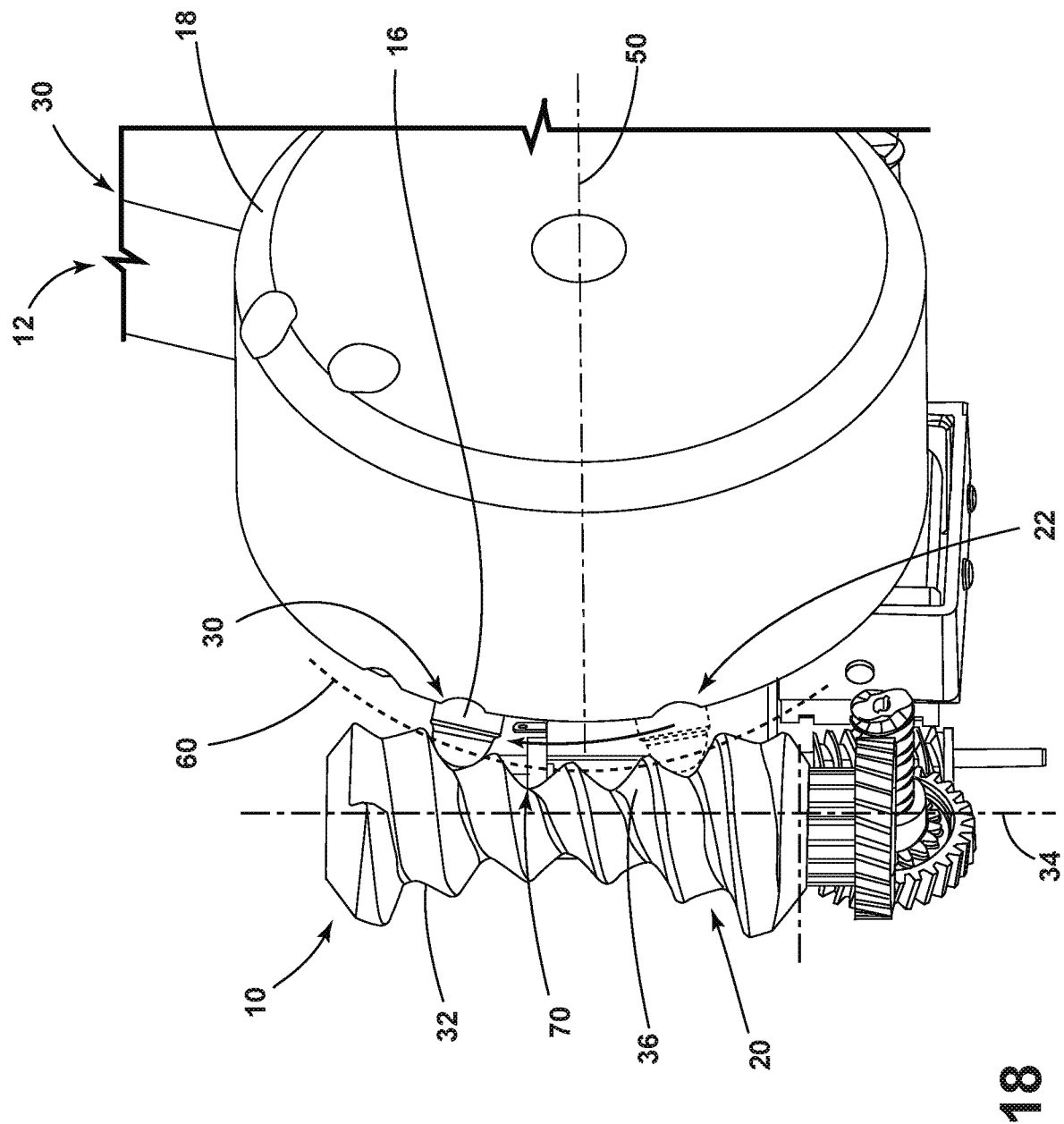
FIG. 18 is an enlarged perspective view of the selector mechanism of FIG. 17 showing operation of the selector interface between the park and drive positions.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-14, reference numeral 10 generally refers to a mechanical return-to-park feature that is incorporated within a mechanical shifting apparatus 12 for a shift-by-wire mechanism 14. The mechanical return-to-park feature 10 includes a detent member 16 that extends from a mechanical selector interface 18. The detent member 16 engages an artificial feel positioner 20 to define, in a visual and tactile feedback, the selected position 22 of the transmission. These selected positions 22 typically include Park, Reverse, Neutral, Drive and various manual shift positions that correspond to positions of the shift-by-wire mechanism 14. The mechanical selector interface 18 operates the one or more detent members 16, typically one detent, through the artificial feel positioner 20 to provide a visual indication of the selected position 22 for the transmission. In this manner, the mechanical selector interface 18 can reflect the selected position 22. In addition, the mechanical selector interface 18 can provide an electronic instruction to the shift-by-wire mechanism 14 for manipulating the transmission to define the various gear positions 70 of the transmission. The shift-by-wire mechanism 14 also cooperates with the mechanical shifting apparatus 12 to define a park lock that can be activated when the shift-by-wire mechanism 14 defines a park position 30.

Referring again to FIGS. 1-14, the selector mechanism includes a selector interface 18 having the detent member 16. The artificial feel positioner 20 defines a plurality of artificial feel positions 40 that corresponds to various selectable positions 42 of the selector interface 18. The plurality of artificial feel positions 40 are connected via a screw channel 36 that helically extends along the artificial feel positioner 20. In this manner, the screw channel 36 is a continuous channel and corresponding screw ridge 130 that extends helically along the surface of the artificial feel positioner 20. The positioner actuator 90, typically a motor, rotationally operates the artificial feel positioner 20 to automatically operate the detent member 16 through the screw channel 36 to move or otherwise translate the detent member 16 and the selector interface 18 to a desired selectable position 42 of the detent member 16 and the selector interface 18. The selector interface 18 is a rotationally operable member that rotates about the selector rotational axis 50. The desired selectable position 42 of the plurality of artificial feel positions 40 is a predetermined rotational position 114 of the selector interface 18 with respect to the selector rotational axis 50.

Referring again to FIGS. 1-14, to accommodate this translation of the detent member 16 and the selector interface 18 through rotation of the artificial feel positioner 20, the screw channel 36 of the artificial feel positioner 20 includes an outer curved profile 60 that is concentric to the selector rotational axis 50 of the selector interface 18. Accordingly, as the artificial feel positioner 20 rotates about the positioner rotational axis 34, the detent member 16 is translated about the selector rotational axis 50 and is maintained within the screw channel 36. Through this concentric orientation of the curved profile 60, the detent member 16 continuously engages the screw channel 36 as the selector interface 18 rotates about the selector rotational axis 50. The positioner actuator 90 can be coupled to the artificial feel positioner 20 via a first gear train 92. The first gear train 92 can be used to reorient the rotational motion of the positioner actuator 90 within the housing 94 for the shifting apparatus 12. The first gear train 92 can also be used as a gear reduction mechanism to modify the speed and/or the mechanical advantage provided by the positioner actuator 90.

When a vehicle is stopped, in certain instances, it may be necessary to automatically return the transmission of the vehicle to a Park position 30. Within the shift-by-wire mechanism 14, this happens electronically and typically without engagement of the selector interface 18 of the mechanical shifting apparatus 12. To provide a visual and tactile feedback of this automatic operation of the shift-by-wire mechanism 14, a mechanical return-to-park feature 10 utilizes the artificial feel positioner 20 to return the mechanical selector interface 18 to the Park position 30. To accomplish this, the artificial feel positioner 20 includes a helical screw 32 that engages the detent member 16. The artificial feel positioner 20 rotationally operates about the positioner rotational axis 34. As the artificial feel positioner 20 rotates, the detent member 16 is slidably operated or translated within the screw channel 36, such as an Archimedes screw, and is manipulated along the screw channel 36 of the artificial feel positioner 20. As the detent member 16 is moved translated along the screw channel 36, this also biases the mechanical selector interface 18 about the selector rotational axis 50 and back to the Park position 30.

As exemplified in FIGS. 1-14, because the detent member 16 operates about a selector rotational axis 50 that is typically perpendicular to the positioner rotational axis 34, the artificial feel positioner 20 includes an outer curved profile 60 that is concentric with the selector rotational axis 50. Accordingly, the screw channel 36 of the artificial feel positioner 20 operates through this curved profile 60 to allow the detent member 16 to rotationally operate about the selector rotational axis 50 and simultaneously translate along the screw channel 36 of the artificial feel positioner 20. Again, the artificial feel positioner 20 rotates about the positioner rotational axis 34 and the screw channel 36 operates to translate the detent member 16 along the curved profile 60 that is concentric with the selector rotational axis 50.

It is contemplated that the artificial feel positioner 20 having the screw channel 36 can be utilized with a linear operating selector interface 18, where the artificial feel positioner 20 is positioned along a linear axis that the linear operating selector operated through. It is also contemplated that the artificial feel positioner 20 having the screw channel 36 can operate with respect to a rotary selector. In such an embodiment, the artificial feel positioner 20 is typically oriented in a generally horizontal configuration. In the various aspects of the device, the curved profile 60 of the screw channel 36 is concentric with the selector rotational axis 50 of the selector interface 18.

When the artificial feel positioner 20 is in a stationary state 110, a profile of the artificial feel positioner 20 facing the detent member 16 defines the various gear positions 70 of the selector interface 18. Because the artificial feel positioner 20 can rotate, the exact rotational placement of the gear positions 70 relative to the selector interface 18 and the selector rotational axis 50 may change slightly over time as the artificial feel positioner 20 is rotated for returning the detent member 16 to the Park position 30, or another of the gear positions 70. Accordingly, various calibrations may occur periodically. These calibrations serve to define or redefine the relative rotational positions 114 and locations of the various gear positions 70 with respect to the mechanical selector interface 18. While these gear positions 70 maintain a consistent spacing 112 or relative spacing 112 with respect to one another, the rotational position 114 of the detent member 16 with respect to the rotational axis and each gear position 70 may change over time. The calibration of the selector interface 18 can be used to account for these minor variations in the positioning of the various gear positions 70.

In various aspects of the device, the gear positions 70 can include a consistent spacing 112 through the use of an artificial feel positioner 20 having a screw channel 36 and screw ridge 130 with a consistent width. It is also contemplated that the artificial feel positioner 20 can have a variable thread or irregular thread. This can produce a screw channel 36 and screw ridge 130 having a variable distance between the gear positions 70. In this embodiment, operation of the artificial feel positioner 20 can modify the rotational position 114 of the gear positions 70 about the selector rotational axis 50 without significantly modifying the relative spacing 112 of the gear positions 70 relative to one another.

It is also contemplated that after the artificial feel positioner 20 rotates to return the detent member 16 to a Park position 30, the artificial feel positioner 20 can return to a consistent home position 120 such that the gear positions 70 may maintain the consistent spacing 112 and consistent rotational position 114 with respect to the selector rotational axis 50 of the selector interface 18. The home position 120 can also serve to reset a relative rotational angle or placement of the plurality of artificial feel positions 40 of the artificial feel positioner 20 with respect to the selector rotational axis 50 of the selector interface 18.

Additionally, when the artificial feel positioner 20 returns the detent member 16 and the selector interface 18 is in the Park position 30, a park-lock mechanism 102 can engage to secure the selector interface 18 in the Park position 30.

The artificial feel positioner 20 can be operated through a dedicated positioner actuator 90 that operates the artificial feel positioner 20 about the positioner rotational axis 34. As the artificial feel positioner 20 rotates, the screw channel 36 guides and translates the detent member 16 about the selector rotational axis 50. In this manner, the screw channel 36 of the artificial feel positioner 20 automatically returns the detent member 16 to the Park position 30, home position 120 or other desired rotational position 114 relative to the selector rotational axis 50. This positioner actuator 90 and the artificial feel positioner 20 can also include various positioning sensors that monitor when the detent member 16 has reached the Park position 30, home position 120 or other desired rotational position 114. Accordingly, if the detent member 16 slips over a continuous screw ridge 130 that defines the screw channel 36, the positioner actuator 90 will continue to operate until the detent member 16 reaches the Park position 30, home position 120 or other desired rotational position 114. If the Park position 30 cannot be reached, due to an obstruction in the way of the mechanical selector interface 18, for example, a signal or other alert can be activated. It should be understood that the shift-by-wire mechanism 14 will return the transmission to the Park gear whether the mechanical selector interface 18 operates to the Park position 30 or not. The return-to-park feature 10 described herein is typically used to provide the visual indication that the transmission has automatically returned to the Park gear.

In certain aspects of the device, the shift-by-wire mechanism 14 can include a locking actuator 100 that operates a park-lock mechanism 102 to maintain the shift-by-wire mechanism 14 and the mechanical selector interface 18 in the Park position 30 or other rotational position 114. It is contemplated that this locking actuator 100 can be in the form of a solenoid, a motor or other actuator capable of actuating the park-lock mechanism 102. It is also contemplated that the park-lock mechanism 102 is a separate assembly that cooperates with the artificial feel positioner 20. It is also contemplated that the park-lock mechanism 102 is incorporated with the locking actuator 100. In such an embodiment, the positioner actuator 90 and the locking actuator 100 may be a single actuator. In such an instance, the locking actuator 100, while operating the park-lock mechanism 102, can also be used to manipulate the artificial feel positioner 20 about the positioner rotational axis 34. In such an embodiment, where the automatic return-to-park feature 10 is utilized, the locking actuator 100 can be used to bias a park-lock lever 104 toward the park-lock position 106. At the same time, this locking actuator 100 can be used to manipulate the artificial feel positioner 20 about the positioner rotational axis 34 to manipulate the detent member 16 through the screw channel 36 and about the selector rotational axis 50 for returning the detent member 16 and the mechanical selector interface 18 to the Park position 30. In such an aspect of the device, the park-lock mechanism 102 and the artificial feel positioner 20 can be operated by a common motor, solenoid, or other similar actuator for manipulating each of the park-lock mechanism 102 and the artificial feel positioner 20. The park-lock mechanism 102 can also include a second gear train 118 that transfers the rotational or axial motion of the locking actuator 100 within the housing 94. The second gear train 118 can also be used to modify the speed and/or mechanical advantage of the locking actuator 100.

Referring now to FIGS. 15-18, the park-lock mechanism 102 can be operated through the use of a solenoid that actuates in a generally linear configuration. Through this configuration, the park-lock lever 104 is operated through the actuation of the solenoid to engage and disengage a portion of the selector interface 18.

Referring now to FIGS. 1-18, according to the various aspects of the device, the artificial feel positioner 20 can be oriented in various configurations with respect to the selector interface 18 and the detent member 16 that is incorporated within the selector interface 18. These various configurations can be based upon the size and dimensional constraints of the particular selector mechanism and the components contained therein. Accordingly, the artificial feel positioner 20 can be oriented in a horizontal configuration, vertical configuration, or other angular configuration that permits engagement between the detent member 16 of the selector interface 18 and the screw channel 36 of the artificial feel positioner 20.

In certain aspects of the device, it is contemplated that the rotational operation of the artificial feel positioner 20 can be utilized in a wire-operated shift mechanism. In such an embodiment, rotation of a feel positioner can be used to manipulate the detent member 16 toward the Park position 30. This manipulation of the detent member 16 not only moves the mechanical selector interface 18, but also operates the shifting mechanism coupled with the transmission for returning the transmission to a Park position 30, or another gear position 70. In such an embodiment, various locking mechanisms or securing mechanisms are included within the detent member 16 to prevent the detent member 16 from slipping through the gear positions 70 of the screw channel 36 as the detent member 16 moves through the screw channel 36 of the artificial feel positioner 20. Additionally, because the selector interface 18 is connected with a wire for mechanically operating the transmission, the positioner actuator 90 for operating the feel positioner is typically a higher power motor for not only operating the detent member 16 to the Park position 30, but also mechanically operating the wire for the transmission to manipulate the transmission to the Park position 30.

Typically, the artificial feel positioner 20 having a screw channel 36 will be utilized in a shift-by-wire mechanism 14. Accordingly, the engagement of the screw channel 36 with the detent member 16 will be engaged to operate the detent member 16 to the Park position 30. Accordingly, the screw channel 36 will only be required to overcome a force of gravity and any dampening or tactile-related features of the selector interface 18 for returning the detent member 16 to the Park position 30. Accordingly, a lower power motor can be utilized for operating the artificial feel positioner 20 and the screw channel 36. As discussed herein, the lower power motor can also be used for manipulating the artificial feel positioner 20 to any of the gear positions 70. Such a function may be implemented in an automatic parallel park function for a vehicle.

In the exemplary case of an automatic parallel park function, the shift-by-wire mechanism 14 can be automatically manipulated between the Drive and Reverse gear positions 70. During these automatic manipulations of the shift-by-wire mechanism 14, the artificial feel positioner 20 can be operated to reflect these manipulations through the position of the selector interface 18. Ultimately, after the automatic parallel park function is complete, the shift-by-wire mechanism 14 engages the Park position 30 and the selector interface 18 reflects this operation. As discussed herein, operation of the artificial feel positioner 20 operates the selector interface 18 between various gear positions 70. In certain instances, the manipulation of the selector interface 18 by the automatic feel positioner 20 can be used to select certain gear positions 70, such as the Drive, Neutral and Reverse gear positions 70. The Park position 30 is typically engaged by the shift-by-wire mechanism 14 and operation of the selector interface 18 reflects this change.

Referring again to FIGS. 1-18, the selector mechanism can be positioned within a vehicle (not shown). Typically, the selector mechanism will be associated with a gear selector or gear shifter for selecting various gears or for reflecting the selection of various gears associated with a transmission. The selector interface 18 includes the positioning member, which is typically in the form of a detent member 16. The artificial feel positioner 20 includes a continuous screw channel 36 that defines the plurality of selectable positions 42 of the selector interface 18. The continuous screw channel 36, in a stationary state 110, defines a detent relationship between the detent member 16 and the continuous screw channel 36. In the stationary state 110, the continuous screw channel 36 defines a corresponding rotational position 114, with respect to the selector rotational axis 50 of the selector interface 18, of each selectable position 42 of the plurality of selectable positions 42. As discussed above, depending upon the rotational position 114 of the artificial feel positioner 20, the relative positions of the plurality of selectable positions 42 can vary in relation to the selector rotational axis 50. The positioner actuator 90 operates to define a translating state 140, where the artificial feel positioner 20 rotates about the positioner rotational axis 34. Operation of the positioner actuator 90 guides the detent member 16 through the continuous screw channel 36 and about the selector rotational axis 50. As discussed above, the positioner actuator 90 is typically a motor, such as a stepper motor, that rotationally operates the artificial feel positioner 20 about the positioner rotational axis 34. This motor can be in the form of a dual-direction motor that can operate the artificial feel positioner 20 in clockwise and counterclockwise directions. In certain aspects of the device, it is contemplated that the positioner actuator 90 can be a single directional motor that is configured to only operate the artificial feel positioner 20 and, in turn, the detent member 16, toward the Park position 30. Rotation of the detent member 16 and the selector interface 18 away from the Park position 30 can be accomplished through operation of the detent member 16 of the selector interface 18 through the selectable positions 42 of the artificial feel positioner 20 in the stationary state 110.

Referring again to FIGS. 1-18, the artificial feel positioner 20 includes a continuous ridge that defines the continuous screw channel 36. The continuous ridge, in the stationary state 110, separates the plurality of selectable positions 42 to define a consistent spacing 112 of the plurality of selectable positions 42. As the detent member 16 operates between the plurality of selectable positions 42, the detent member 16 deflects as it engages the continuous screw ridge 130 and operates between the plurality of selectable positions 42 in the stationary state 110. When the artificial feel positioner 20 is in the translating state 140, the continuous screw ridge 130 guides the positioning member, typically in the form of the detent member 16, through the continuous screw channel 36 to a desired position of the plurality of selectable positions 42.

Referring again to FIGS. 1-18, the selector mechanism includes the selector interface 18 having the detent member 16. The artificial feel positioner 20 includes a continuous screw ridge 130. The continuous screw ridge 130, in the stationary state 110, defines a plurality of artificial feel positions 40 and the consistent spacing 112 therebetween. The artificial feel positions 40 of the continuous screw ridge 130 correspond to the selectable positions 42 of the selector interface 18. The plurality of artificial feel positions 40 are connected via the continuous screw ridge 130 that helically extends along the artificial feel positioner 20 to define the screw channel 36. The positioner actuator 90 rotationally operates the artificial feel positioner 20 to define a translating state 140. Operation of the positioner actuator 90 translates the detent member 16 along the continuous screw ridge 130 and through the screw channel 36 to translate the detent member 16 and the selector interface 18 about the selector rotational axis 50 of the selector interface 18 to a desired rotational position 114 relative to the selector rotational axis 50.

According to various aspects of the device, as exemplified in FIGS. 1-18, the selector mechanism can optionally include the locking mechanism that is coupled to the selector interface 18. The locking mechanism includes a locking actuator 100 that selectively secures the selector interface 18 in a predetermined rotational position 114 with respect to the selector rotational axis 50. The locking mechanism is typically in the form of a park-lock mechanism 102 having a park-lock lever 104. The park-lock lever 104 operates to engage a portion of the selector interface 18 to secure the selector interface 18 in the predetermined rotational position 114. Typically, this predetermined rotational position 114 will be the Park position 30 of the selector interface 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selector mechanism comprising:
   a selector interface having a detent member, the selector interface being rotationally operable about a rotational axis;
   an artificial feel positioner that defines a plurality of artificial feel positions that correspond to selectable positions of the selector interface, wherein the plurality of artificial feel positions are connected via a screw channel that helically extends along the artificial feel positioner;
   a motor that rotationally operates the artificial feel positioner to automatically operate the detent member through the screw channel to move the detent member and the selector interface to a desired position of the detent member and the selector interface, wherein the desired position is a predetermined rotational position of the selector interface with respect to the rotational axis, and wherein the screw channel of the artificial feel positioner includes a profile that is concentric to the rotational axis of the selector interface.

2. The selector mechanism of claim 1, wherein the detent member continuously engages the screw channel as the selector interface rotates about the rotational axis.

3. The selector mechanism of claim 1, wherein the selector interface is coupled with a shift-by-wire mechanism for a vehicle, and wherein the selector interface includes a locking mechanism that selectively secures the selector interface in the predetermined rotational position relative to the rotational axis.

4. The selector mechanism of claim 1, wherein one feel position of the plurality of artificial feel positions defines a home position, wherein the home position operates to reset a rotational angle of the plurality of artificial feel positions with respect to the rotational axis of the selector interface.

5. The selector mechanism of claim 3, wherein the locking mechanism is operated by one of the motor and a solenoid.

6. A selector mechanism for a vehicle, the selector mechanism comprising:
   a selector interface having a positioning member;
   an artificial feel positioner having a continuous screw channel that defines a plurality of selectable positions of the selector interface, wherein the continuous screw channel in a stationary state defines a detent relationship between the positioning member and the continuous screw channel that defines a corresponding rotational position, with respect to a rotational axis of the selector interface, of each selectable position of the plurality of selectable positions; and
   an actuator that operates to define a translating state that rotates the artificial feel positioner about a positioner rotational axis, wherein operation of the actuator guides the positioning member through the continuous screw channel and about the rotational axis of the selector interface, wherein the continuous screw channel includes a profile that is concentrically oriented about the rotational axis of the selector interface.

7. The selector mechanism of claim 6, wherein the artificial feel positioner includes a continuous ridge that defines the continuous screw channel, wherein the continuous ridge in the stationary state separates the plurality of selectable positions to define a consistent spacing of the plurality of selectable positions, and wherein the positioning member is a detent that deflects as the selector interface engages the continuous ridge and operates between the plurality of selectable positions when the artificial feel positioner is in the stationary state.

8. The selector mechanism of claim 7, wherein the continuous ridge in the translating state guides the positioning member through the continuous screw channel to a desired position of the plurality of selectable positions.

9. The selector mechanism of claim 6, wherein one feel position of the plurality of selectable positions defines a home position, wherein the home position operates to reset the corresponding rotational position of the plurality of selectable positions with respect to the rotational axis of the selector interface.

10. The selector mechanism of claim 6, wherein the positioning member continuously engages the continuous screw channel as the selector interface rotates about the rotational axis.

11. The selector mechanism of claim 6, wherein the selector interface is coupled with a shift-by-wire mechanism that includes a park lock, wherein engagement of the park lock activates a motor to rotate the artificial feel positioner about the positioner rotational axis.

12. The selector mechanism of claim 11, wherein the park lock includes a locking mechanism that engages the selector interface.

13. A selector mechanism comprising:
    a selector interface having a detent member;
    an artificial feel positioner having a continuous screw ridge, wherein the continuous screw ridge in a stationary state defines a plurality of artificial feel positions, the artificial feel positions corresponding to selectable positions of the selector interface, wherein the plurality of artificial feel positions are connected via the continuous screw ridge that helically extends along the artificial feel positioner to define a screw channel;
    a positioner actuator that rotationally operates the artificial feel positioner to define a translating state, wherein operation of a motor translates the detent member along the continuous screw ridge and through the screw channel to translate the detent member and the selector interface about a rotational axis of the selector interface to a desired rotational position relative to the rotational axis, wherein the continuous screw ridge and the screw channel define a profile that is concentrically oriented about the rotational axis of the selector interface.

14. The selector mechanism of claim 13, further comprising:
    a locking mechanism that is coupled to the selector interface, wherein the locking mechanism includes a locking actuator that selectively secures the selector interface in a predetermined rotational position with respect to the rotational axis.

15. The selector mechanism of claim 14, wherein the predetermined rotational position and the desired rotational position define a home position of the selector interface.

16. The selector mechanism of claim 13, wherein the selector interface is coupled with a shift-by-wire mechanism, and wherein the continuous screw ridge in the stationary state separates the selectable positions of the shift-by-wire mechanism.

17. The selector mechanism of claim 13, wherein the detent member deflects as the selector interface translates between the selectable positions when the artificial feel positioner is in the stationary state.

18. The selector mechanism of claim 13, wherein one feel position of the plurality of artificial feel positions defines a home position, wherein the home position operates to reset corresponding rotational angles of the plurality of artificial feel positions, respectively, in relation to the rotational axis of the selector interface.

19. The selector mechanism of claim 13, wherein the detent member continuously engages the screw channel as the selector interface rotates about the rotational axis.

20. The selector mechanism of claim 13, wherein the artificial feel positioner has a positioner rotational axis about which the continuous screw ridge is oriented, and wherein the positioner rotational axis is perpendicular to the rotational axis of the selector interface.

* * * * *